United States Patent Office 3,270,348
Patented August 30, 1966

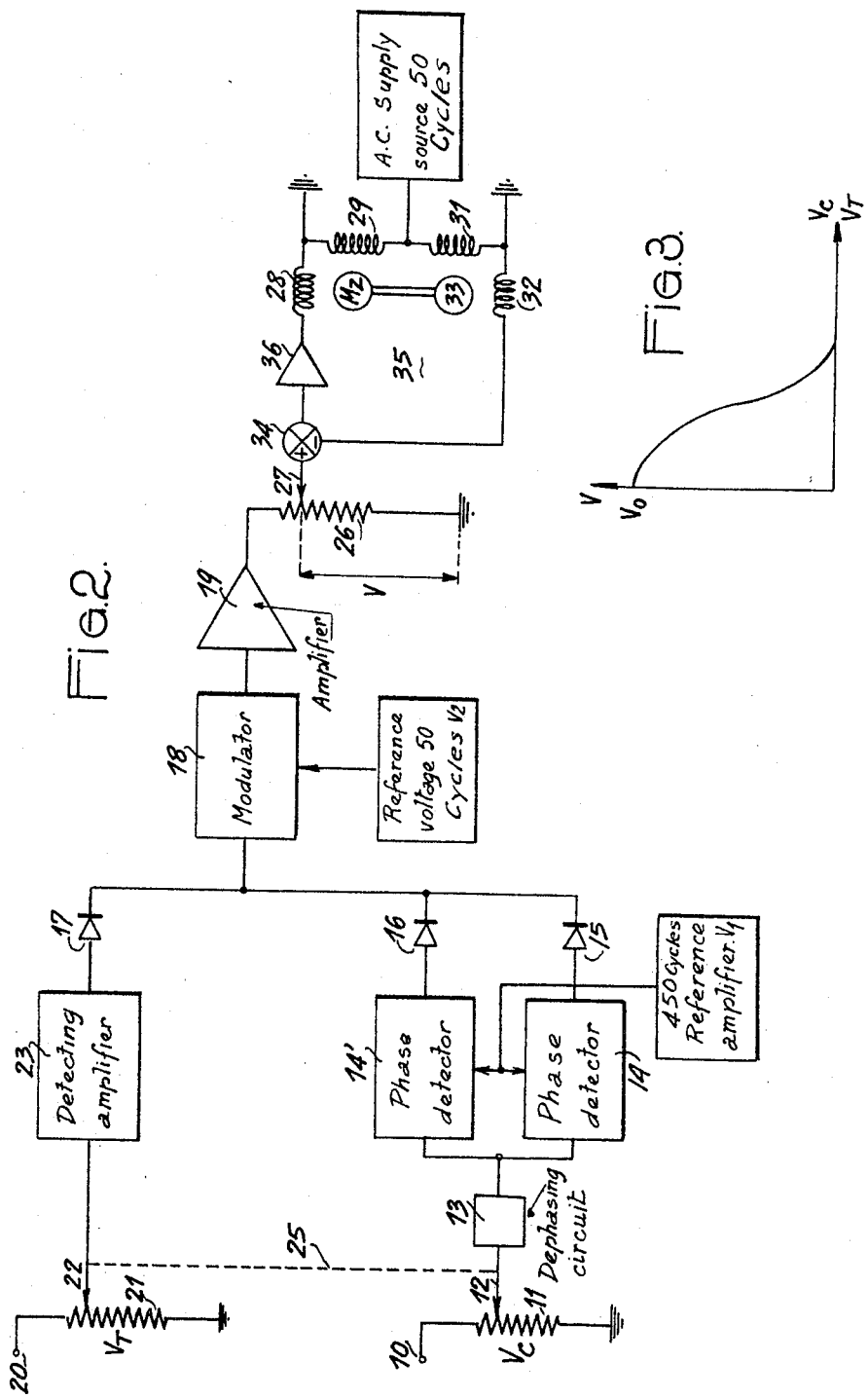

3,270,348
DEVICE FOR CONTROLLING THE DISPLACEMENT SPEED OF A SAMPLE TO BE SCANNED, PARTICULARLY FOR A RECORDING MICRODENSITOMETER
Daniel Lesage, Paris, Roger Marie Arthur Monnot, Montrouge, and Pierre Vialet, Chalon-sur-Saone, France, assignors to Compagnie des Compteurs, Paris, France, a company of France
Filed Mar. 4, 1964, Ser. No. 349,400
Claims priority, application France, Mar. 5, 1963, 926,853, Patent 1,358,547
6 Claims. (Cl. 346—33)

The present invention relates to a device for controlling the displacement speed of a sample or specimen to be scanned, particularly a photographic plate having a variable optical density in a comparison recording microdensitometer.

It is known that in such apparatuses measuring of the density of a sample to be analysed is generally effected by comparing the density of a sample point and the density of at least a variable opacity filter with the utilization position thereof, such as a photometric wedge, by means of two luminous beams issuing from a common source of light, along two comparison paths and applied in a rapid sequence onto one and the same photoelectric cell. The comparison is realized by so adjusting the photometric wedge position that both luminous fluxes impinging onto said cell along both paths are equal, such balance being automatically obtained by means of a servoing device which controls the movement of the wedge so that to cancel the discrepancy existing between the two recited fluxes. Thus, the position of the wedge constitutes a measure of the optical density of the sample area undergoing the analysis.

Moreover such apparatuses are provided with a recording device having a diagram-holder table which is moved jointly with the sample to be analyzed according to a rectilinear movement, and with a scribing member which is driven by the filter, so that to obtain on the table a recording of the optical density as a function of the movement of the sample.

The sample of specimen is supported by a sample-holder table which is connected to the diagram-holder table by a mechanical connecting device. The movement of the diagram-holder table, and consequently that of the sample-holder table, is controlled by a servo-motor, the rotation speed of which determines the analysis speed of the sample.

Besides, said photometric wedge is driven by a servoing device which is in turn driven by an independent motor, and the speed that this servoing device is capable to impart to the latter is limited by the driving motor characteristics and the inertia of the moving parts.

If it is desired to obtain a true and accurate recording of the density of a highly contrasted sample, it is then necessary to cause the latter to run slowly so that the servoing is able to maintain a very small position discrepancy. In compensation, under such conditions, scanning of the slightly contrasted areas of the sample is effected at a speed which is very less than the maximum possible (and desirable) speed, and the time duration of the scanning is thus correspondingly extended.

The present invention has for its main object to provide a device for controlling the sample analysis speed, operating so that to maintain at every moment said speed at the maximum speed consistent with the correct operation of the servoing device of the measuring member, i.e., the photometric wedge.

Another object of this invention is to impart to the sample a running speed which varies in inverse ratio to the density gradient encountered during the analysis of said sample.

Still another object of this invention is to perfectly synchronize the feed speed of the recording table with that of the measuring wedge.

According to the present invention, the control device includes: a circuit generating a D.C. voltage, having always the same polarity, from two voltages of which one is derived from the control voltage of the motor driving the measuring member, the second being derived from the output voltage of a tachometer generator driven by the same motor, a modulator at the input of which said D.C. voltage is applied, thus delivering a voltage which is proportional to the difference, when such difference is positive, between a reference voltage and the input voltage, and an amplifier which amplifies the modulator output voltage and delivers the applied control voltage, through a speed servoing network to the motor driving the sample, so that the speed thereof varies in inverse ratio to the absolute value of the density gradient encountered by the measuring member.

In addition to the above-mentioned objects, this invention provides two adjustment means in the device controlling the analysis speed, so that:

One of these means determines the maximum value that the control voltage can reach for a zero speed and position discrepancy of the measuring means, i.e. the photometric wedge, thus the value of the maximum running speed of the sample analysed in an area having a zero density gradient; and The other determines the slowing-down efficiency value of the device for a given speed and position discrepancy of the photometric wedge, thus the slowing-down amount imparted to the running speed of the sample analysed in an area of determined density gradient of said sample.

Through the instrumentality of said adjustment means, it is thus possible to modify at will, according to the intended utilization, the compromise between the analysis carrying out quickness and the accuracy of the measure obtained during said analysis.

The invention will be better understood when reading the following description with reference to the annexed drawings, given in an illustrative and by no means limitative manner, which show a preferred embodiment of the invention, and in which:

FIGURE 2 is a block diagram of the device according to this invention.

FIGURE 3 shows a curve representing the control voltage variation against the input voltages.

Figure 1:
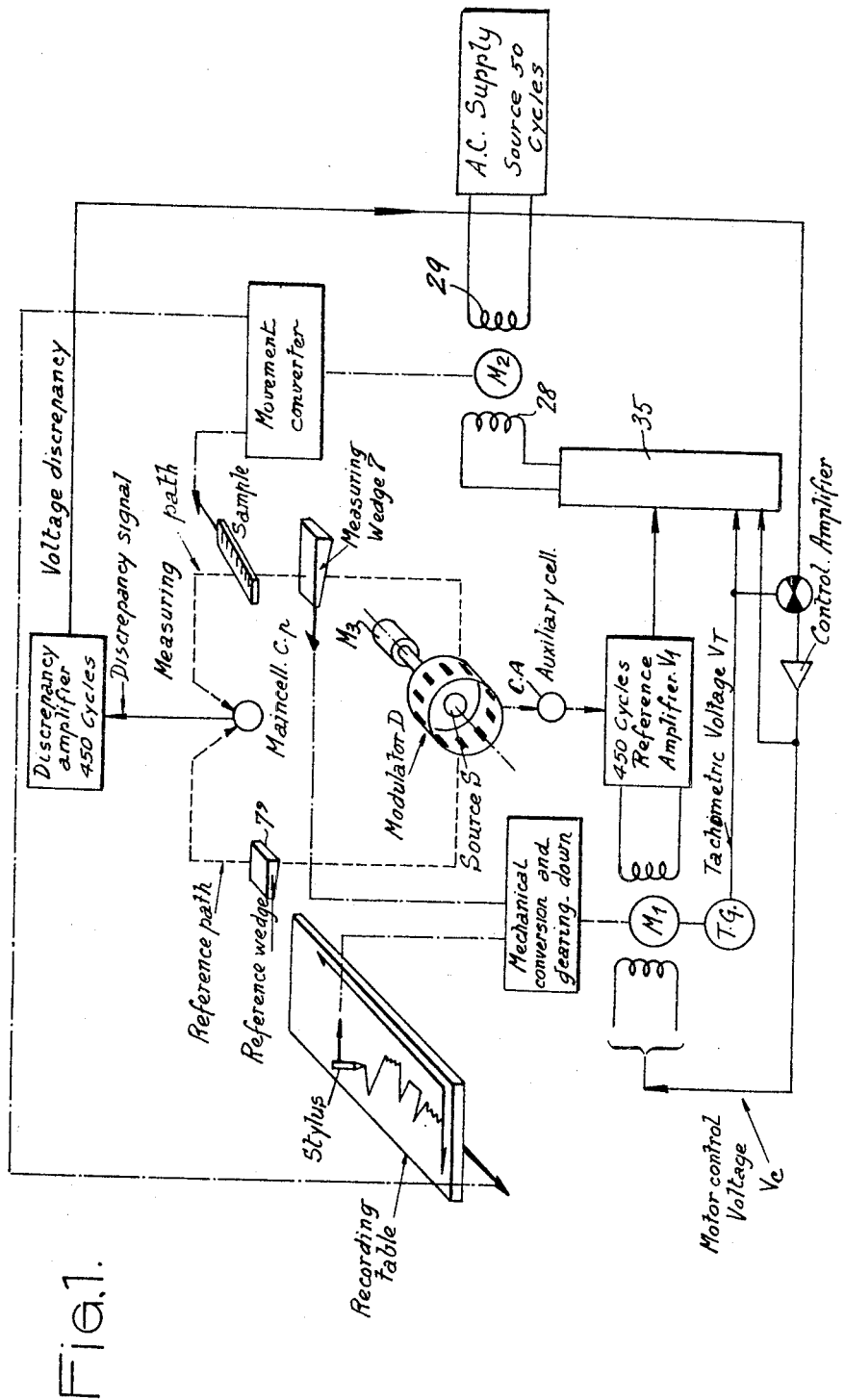
FIGURE 1 is a block diagram of a microdensitometer embodying this invention.

In the schematic representation of FIGURE 1, in order to facilitate understanding, the optical paths have been drawn in dash-lines, and the mechanical connections, which may be of any suitable type and are known per se and do not make part of this invention in dash-and-dot lines. Finally, the electric connections are shown in continuous lines.

The microdensitometer according to FIG. 1 makes use of the principle so-called of double-weighing, which consists in making equal at every moment, for the sample area being analyzed, the luminous fluxes transmitted along two optical paths which are equivalent from an optical standpoint.

The first optical path, the so-called reference optical wedge path, includes a reference optical wedge 7' which is fixed during each analysis, but can be adjusted as a function of the elements to be scanned which are particular to each recording. The second optical path, the so-called measuring path, includes the sample or specimen the density of which is to be measured, and a measuring photometric wedge 7 the optical density of which varies as a function of the position thereof according to a known function. Wedge 7 is servoed to a motor $M_1$ and to a "device of mechanical conversion and gearing-down," so that the absorption of light by wedge 7, to which is added the absorption of light by the sample, maintain the balance with the light passing through wedge 7'. Thus, the position of photometric wedge 7 constitutes a measure of the optical density of the sample area being analyzed and, consequently, the device of mechanical conversion and gearing-down operates also the stylus of a recording table, moved in turn as shown by the arrow, by a "movement converter" which is driven by a motor $M_2$ and is used also to move the "sample or specimen" according to the arrow shown in FIG. 1.

Both optical reference and measuring paths originate from a common source of light S which is modulated by a light modulator D having nine windows alternating with nine plain parts of the same angular width. Modulator D is driven by a synchronous motor $M_3$ supplied with 50 cycle A.C. current, so that the luminous fluxes of both paths have a common fundamental frequency of 450 cycles, and are in a 180° phase displacement relationship.

The modulation amplitude of each of said luminous fluxes is a function of the absorption undergone by each of the latter along the corresponding path thereof, thus a function of the added optical densities of the elements they pass through. Both luminous fluxes are directed onto a common photoelectric cell $C_p$ which delivers a discrepancy signal corresponding to the resulting flux which lights said cell.

If the measuring wedge 7 assumes such a position that said both luminous fluxes are not equivalent, the stronger flux assigns its own modulation phase to the resulting flux, thus to the electric signal having a frequency of 450 cycles originating from cell $C_p$. This signal represents by the amplitude and phase thereof the quantity and direction of the measuring and reference flux unbalance. Said signal is applied into the "discrepancy 450 cycle amplifier" in FIG. 1. Said discrepancy amplifier controls a "control amplifier," in FIG. 1, which delivers a control voltage $V_c$ applied to one of the windings of motor $M_1$ advantageously comprising a two-phase induction motor, the control phase of which receives said control voltage $V_c$ from the control amplifier, and the second phase of which is supplied with a voltage originating from a "reference 450 cycle amplifier." Said reference 450 cycle amplifier is operated by a voltage from an "auxiliary cell CA" so disposed with respect to modulator D that it is supplied with a modulated luminous flux which is in quadrature with the luminous measuring and reference fluxes.

According to this invention, it has been found that advantageously the "sample" and the "recording table," which are mechanically ganged together and moved by the "movement converter" should not be always moved at a constant speed for the reason mentioned above, so that to suitably insure certain recordings as is the case particularly for the recording of a spectrum of lines, in which great variations of density occur along the analysis trajectory. In effect, it is indispensable in such a case, however quick may be the servoing of measuring wedge 7, to slow down the movement of the sample and the recording table.

Consequently, there has been provided a device for controlling the sample analysis speed or the automatic slowing-down, which adjusts the sample movement speed, or analysis speed, as a function of the different variables mentioned hereinafter.

The means for adapting the speed of the sample movement and that of the recording table are shown in FIG. 2 wherein the control voltage $V_c$ of motor $M_1$ driving photometric wedge 7, and the voltage $V_T$ delivered by the tachometer generator T.G. driven by said motor, are respectively applied to the terminals 10 and 20 of two potentiometers 11 and 21 of which the sliding contacts 12 and 22 are mechanically ganged by an insulated connection 25. Sliding contact 12 is connected, through a dephasing circuit 13 comprising in a known manner two capacitive resistance assemblies, to one of the inputs of two phase detector circuits 14 and 14' which are shunt connected. Each of said phase detectors 14 and 14' comprises a diode rectifier bridge, and these two rectifier bridges, which are identical, are connected in opposition so that the polarity of the signals received from the dephasing circuit 13 is taken into consideration. Said dephasing circuit 13 is provided to cause the active component of the motor $M_1$ control voltage $V_c$ to be in phase or in a 180° phase displacement relationship with the reference voltage $V_1$ from the reference amplifier, said reference voltage being applied to the phase detector circuits 14 and 14' through a second input thereof so that to obtain a correct response therefrom. Voltage $V_1$ is thus applied as having the frequency of the voltage exciting the motor $M_1$ which drives wedge 7. The sliding contact 22 is connected to the input of a detecting amplifier 23. The outputs of both phase detectors 14, 14' and of amplifier 23 are connected to the input of a modulator 18 through three rectifiers 15, 16 and 17 all connected in the same direction, so that a D.C. voltage is applied to said modulator. On the other hand, modulator 18 is supplied with a reference voltage $V_2$, e.g. at 50 cycles. Said modulator 18 comprises, for example, a diode supplied, on the one hand, by said reference voltage $V_2$ and driven, on the other hand, by the D.C. voltage from detectors 14, 14' and 23, so that only one half wave of the A.C. voltage is rectified, and the amplitude of said half wave is a direct function of the D.C. control voltage. The output signal or voltage from modulator 18 is amplified in an A.C. amplifier 19, from the output terminals of which it is applied to a potentiometer 26, the sliding contact 27 thereof being connected to the input of a speed servoing network designated generally by 35, and including an adding network 34, an amplifier 36, said motor $M_2$ driving the sample and a tachometer generator 33 driven by said motor.

The adding network 34 comprises a circuit connected, on the one hand, to the sliding contact 27 and, on the other hand, to the output winding 32 of said tachometer generator 33, so that the output voltage of this generator be opposed to the voltage from potentiometer 26, thus to obtain a resulting differential voltage. The output of said network is connected to the input of amplifier 36 which amplifies the resulting voltage from said adding network 34 in order to supply the control phase winding 28 of motor $M_2$; the fixed phase windings 29 of this motor and the exciting winding 31 of generator 33 are connected to an A.C. voltage source having a fixed frequency, for example 50 cycles, as shown in FIG. 2 wherein said source is designated as "A.C. Supply Source 50 Cycles."

Before explaining the operation of the above-described device, it is desired to point out that the servoing of said wedge 7 consists in bringing the same back to the balance position thereof, and this at a speed which is proportional to its position discrepancy, thus at a speed which is progressively being reduced to zero while approaching the balance position.

It should be taken into consideration that the servoing is delayed by the inertia of the moving elements (movement converter and mechanical connection therebetween, the sample and the table, see FIG. 1). Thus, when the balance position assigned to wedge 7 by the sample varies during the analysis, the risk of overpassing of the permissible position discrepancy depends at every moment not only upon the position discrepancy and the speed of wedge 7 but also upon the next position balance assigned to said wedge 7 but also upon the direction, more or less favorable, of the new corresponding position discrepancy relatively to that of the speed. Since said discrepancy and speed cannot be foreseen, owing to the fact that they depend upon the sample character, there has been devised, according to this invention, for the generation of the order voltage $V_o$ (FIG. 3), which controls the speed of motor $M_2$, to take into consideration the value of the wedge 7 speed, which is represented by the amplitude of the output voltage $V_T$ of tachometer generator 33, as well as the position discrepancy, which is represented by the control voltage $V_c$ of motor $M_1$.

Thus, it is necessary that the order voltage $V_o$ be generated so that it decreases when $V_c$ and/or $V_T$ increases and that it becomes a maximum only when voltages $V_c$ and $V_T$ are simultaneously zero.

Consequently, the device operates as follows:

Potentiometer 11 applies a fraction, suitably phase-displaced by dephasing circuit 13, of the control voltage $V_c$ of motor $M_1$ to the phase detectors 14 and 14' which each deliver at the output of rectifiers 15 and 16 a D.C. voltage proportional to the active component of the input voltage, thus a control one, and the sign of which changes when the phases of such voltage is reversed; these two output D.C. voltages are equal in absolute value but the polarities thereof are opposed. One of said detectors 14 or 14' thus delivers always a positive voltage when the control voltage $V_c$ imparts a speeding-up to motor $M_1$ driving wedge 7, independently of the direction of such a speeding-up.

Potentiometer 21 applies a fraction of the tachometric voltage $V_T$ to the input of detecting amplifier 23 which delivers to the output of rectifier 17 a D.C. positive voltage which is proportional to the input voltage thereof, thus proportional to the speed of the motor driving the wedge, independently of the direction of rotation.

Due to the arrangement of the three rectifiers 15, 16 and 17, only that positive polarity output voltage of the circuits 14, 14' and 23 having the highest amplitude is applied to modulator 18. When the amplitude of said voltage is lower than the amplitude of the reference voltage $V_2$ which is applied to modulator 18, the latter delivers a 50 cycle signal the value of which is proportional to the difference between these two amplitudes. Conversely, when the input voltage amplitude is higher than that of the reference voltage $V_2$, said modulator no longer delivers any signal.

Thus, it can be seen that the output voltage of modulator 18, i.e. the applied control voltage $V_o$, is, after being amplified in amplifier 19 and adjusted through potentiometer 26 in the speed servoing network 35, at a maximum when the $V_c$ and $V_T$ voltages are both zero, and that said voltage $V_o$ decreases when one and/or the other of these two voltages decrease. FIG. 3 shows the variation of said control voltage $V_o$ against $V_c$ or $V_T$.

Through the adjustments provided on the potentiometers 11 and 21, which are ganged, and 26, the user may modify the shape of the curve in FIG. 2 at will, according to the analysis criterion which must predominate: quickness or accuracy, or a compromise therebetween. When manipulating the sliding contact 27 of potentiometer 26, the ordinate at the origin of the voltage $V_o$ is modified, that is the maximum value of said voltage for a zero speed and position discrepancy of the photometric wedge 7, which determines the maximum value of the analysed sample running speed for a gradient area of said sample having a density zero. When manipulating potentiometers 11 and 21, the amplitudes of the input voltages are modified and, consequently the value of the slowing-down efficiency of the device is modified for a given speed and position discrepancy of wedge 7, which determines the amount of slowing-down imparted to the running speed of the analyzed sample for a determined density gradient area. This results in a more or less substantial flattening of the curve.

It is to be understood that the present invention is not limited to the single particular embodiment described above. The device of the invention may be substantially simplified by cancelling the two phase detectors 14, 14' as well as the associated dephasing circuit 13 and the two rectifiers 15, 16, by replacing them by a simple amplifier-rectifier. Also, the dephasing circuit 13 of the first embodiment may be displaced and interposed between modulator 18 and the source delivering the voltage $V_2$.

We claim:

1. In a microdensitometer device having two optical systems traversed by two luminous beams and a photoelectric cell for comparing said luminous beams so that a discrepancy signal can be produced by said cell, one of said optical systems including a movable optical wedge having a variable optical density according to a known function, the other optical system being adapted for the displaceable support of a sample to be analyzed in the path of the respective liminous beam, a first electric motor coupled to said wedge to move the same, so that said discrepancy signal becomes zero according to the position of the sample to be analysed, said sample having a variable optical density gradient which is to be determined, the combination comprising a second electric motor coupled to said sample to move the same, a tachometer generator driven by said first motor and supplying a voltage $V_T$ while said first motor is coupled to said cell to be supplied with a voltage $V_c$ which is a function of said discrepancy signal issued from said cell, a detecting, amplifying and rectifying unit coupled to said generator and to said first motor for receiving said voltages $V_T$ and $V_c$ and for placing said voltages $V_T$ and $V_c$ in a 180° phase-displacement relationship whereby a resulting D.C. voltage is produced, a modulator device and a reference voltage generator for supplying said modulator device with an A.C. voltage, said modulator device being coupled to said detecting, amplifying and rectifying unit for being controlled by said resulting D.C. voltage whereby an A.C. voltage $V_o$ is produced by said modulator device dependent upon said resulting voltage, and an amplifier device coupled to said second motor to apply an amplified value of voltage $V_o$ to said second motor so that the sample driven thereby is moved at a speed which varies in inverse ratio to the gradient value of the density of said sample.

2. In a device as set forth in claim 1, comprising manually adjustable means to adjust the voltage $V_o$ applied to the second electric motor, whereby the maximum speed of the latter is thus manually adjusted.

3. In a device as set forth in claim 2, wherein said manually adjustable means comprises two potentiometers mutually mechanically ganged and electrically insulated, said potentiometers being respectively electrically connected to be respectively supplied with said voltage $V_T$ issuing from said tachometer generator driven by said first motor, and with said voltage $V_c$ supplying said first electric motor, said potentiometers having a manual control whereby a chosen adjustable fraction of said voltages $V_T$ and $V_c$ is applied to said detecting, amplifying and rectifying unit to put said voltages $V_T$ and $V_c$ in opposition, to generate said resulting D.C. voltage, whereby the control of said modulator device is adjusted to vary the speed of said second electric motor and of the sample driven by the latter.

4. In a device as set forth in claim 3, wherein the voltage controlling said first motor is applied to a first of said potentiometers, the voltage from said tachometer generator being applied to a second of said potentiometers, each of said potentiometers including a sliding contact, means ganging mechanically together the sliding contacts of said potentiometers, a dephasing circuit, means electrically connecting the first potentiometer sliding contact to said dephasing circuit the latter comprising a resistance-capacitance circuit, a pair of identical phase detectors connected in opposition, means connecting said dephasing circuit to said two phase detectors, both said phase detectors being constituted by two rectifying bridges, a generator producing a reference A.C. voltage simultaneously supplying both phase detectors respectively in phase and in a 180° phase-displacement relationship relative to the current from said dephasing circuit, two first rectifiers connected to respective phase detectors, a common conductor for said rectifiers, said rectifiers being so connected that only a voltage having a positive polarity and originating from one or the other phase detectors is supplied to said common conductor, an electric detector-amplifier connected to the sliding contact of said second potentiometer, a third rectifier connected to said detector-amplifier so that only a voltage having a positive polarity goes through said third rectifier, said third rectifier being connected to said common conductor, that part of the common conductor which is between said third rectifier and said both first rectifiers being connected to said modulator device, whereby the latter is always supplied with a control positive voltage.

5. In a device as set forth in claim 4, wherein said second electric motor is a two-phase motor, an A.C. current source having a fixed frequency supplying one phase of said motor, a tachometer generator driven by said second motor, to energize said tachometer generator from the same A.C. current source supplying said second electric motor, said adjusting means being electrically connected to said modulator device, means applying the voltage delivered by said tachometer generator in opposition to the A.C. voltage $V_o$, whereby a differential A.C. voltage is produced, a voltage amplifier connected to the second phase of said two-phase motor driving the sample, and means applying said differential voltage to said voltage amplifier.

6. In a device as set forth in claim 1, comprising a movement mechanical converter, means mechanically connecting said second electric motor to said movement mechanical converter, a recording table, means for connecting said movement mechanical converter, on the one hand, to the sample and, on the other hand, to said recording table, whereby said recording table and sample are moved in synchronism, a mechanical conversion and gearing-down device, means mechanically connecting said first electric motor to said mechanical conversion and gearing-down device and a scribing member moved over said recording table, and means connecting said conversion and gearing-down device, on the one hand, to said scribing member and, on the other hand, to said movable optical wedge, whereby said wedge is moved in synchronism with said scribing member.

References Cited by the Examiner
UNITED STATES PATENTS 2,496,967 2/1950 Vassy _____ 88—14 X
2,550,648 4/1951 Sweet _____ 88—14

RICHARD B. WILKINSON, *Primary Examiner.*

LEO SMILOW, *Examiner.*

J. W. HARTARY, *Assistant Examiner.*